(12) United States Patent
Toyoshima et al.

(10) Patent No.: US 7,260,057 B2  
(45) Date of Patent: Aug. 21, 2007

(54) DATA TRANSMISSION SYSTEM

(75) Inventors: Shunsuke Toyoshima, Higashimurayama (JP); Yasuhiro Fujimura, Hamura (JP); Toshiro Takahashi, Hamura (JP)

(73) Assignee: Hitachi, Ltd., Tokyo (JP)

( * ) Notice: Subject to any disclaimer, the term of this patent is extended or adjusted under 35 U.S.C. 154(b) by 1026 days.

(21) Appl. No.: 10/336,723

(22) Filed: Jan. 6, 2003

(65) Prior Publication Data

US 2003/0206048 A1  Nov. 6, 2003

(30) Foreign Application Priority Data

Feb. 5, 2002  (JP) .............. 2002-027895

(51) Int. Cl.
*H04L 5/04*  (2006.01)
(52) U.S. Cl. .............. 370/211; 326/30; 326/86; 327/108; 327/524
(58) Field of Classification Search .............. None
See application file for complete search history.

(56) References Cited

U.S. PATENT DOCUMENTS

| | | | |
|---|---|---|---|
| 4,104,734 A * | 8/1978 | Herndon | 365/228 |
| 5,616,940 A * | 4/1997 | Kato et al. | 257/206 |
| 5,633,599 A * | 5/1997 | Kubota | 326/16 |
| 5,856,750 A * | 1/1999 | Koseki | 327/72 |
| 6,169,311 B1 * | 1/2001 | Iwasaki | 257/358 |
| 6,320,413 B1 * | 11/2001 | Kurisu | 326/73 |
| 6,380,767 B1 * | 4/2002 | Nyu et al. | 327/108 |
| 6,429,717 B1 * | 8/2002 | Maeda | 327/333 |
| 6,509,598 B2 * | 1/2003 | Okuda | 257/300 |
| 6,756,817 B2 * | 6/2004 | Tamura et al. | 326/86 |
| 7,084,668 B2 * | 8/2006 | Miyake | 326/83 |
| 2002/0033715 A1 * | 3/2002 | Maeda | 327/12 |
| 2006/0202719 A1 * | 9/2006 | Nakazato | 326/98 |

FOREIGN PATENT DOCUMENTS

| | | |
|---|---|---|
| JP | 07-202863 | 12/1993 |
| JP | 8-107346 | 10/1994 |
| JP | 11-055106 | 8/1997 |
| JP | 11-154859 | 11/1997 |

* cited by examiner

*Primary Examiner*—Chirag G. Shah
(74) *Attorney, Agent, or Firm*—Reed Smith LLP; Stanley P. Fisher, Esq.; Juan Carlos A. Marquez, Esq.

(57) ABSTRACT

The invention provides a technique that enables a correct discrimination of reception data, when the supply voltage of a semiconductor integrated circuit having a simultaneous bi-directional interface is decreased. The data transmission system is provided with input circuits constituting a simultaneous bi-directional interface by the number of reference voltages used. Each of the input circuits is supplied with a fixed reference voltage, the input circuit supplied with a higher reference voltage employs a differential amplifier with n-channel MOSFETs served as input differential devices, and the input circuit supplied with a lower reference voltage employs a differential amplifier with p-channel MOSFETs served as input differential devices, in which selectors switch the outputs of the two differential amplifiers in correspondence with the output data of their own. Thus, the system attains the reception data.

10 Claims, 12 Drawing Sheets

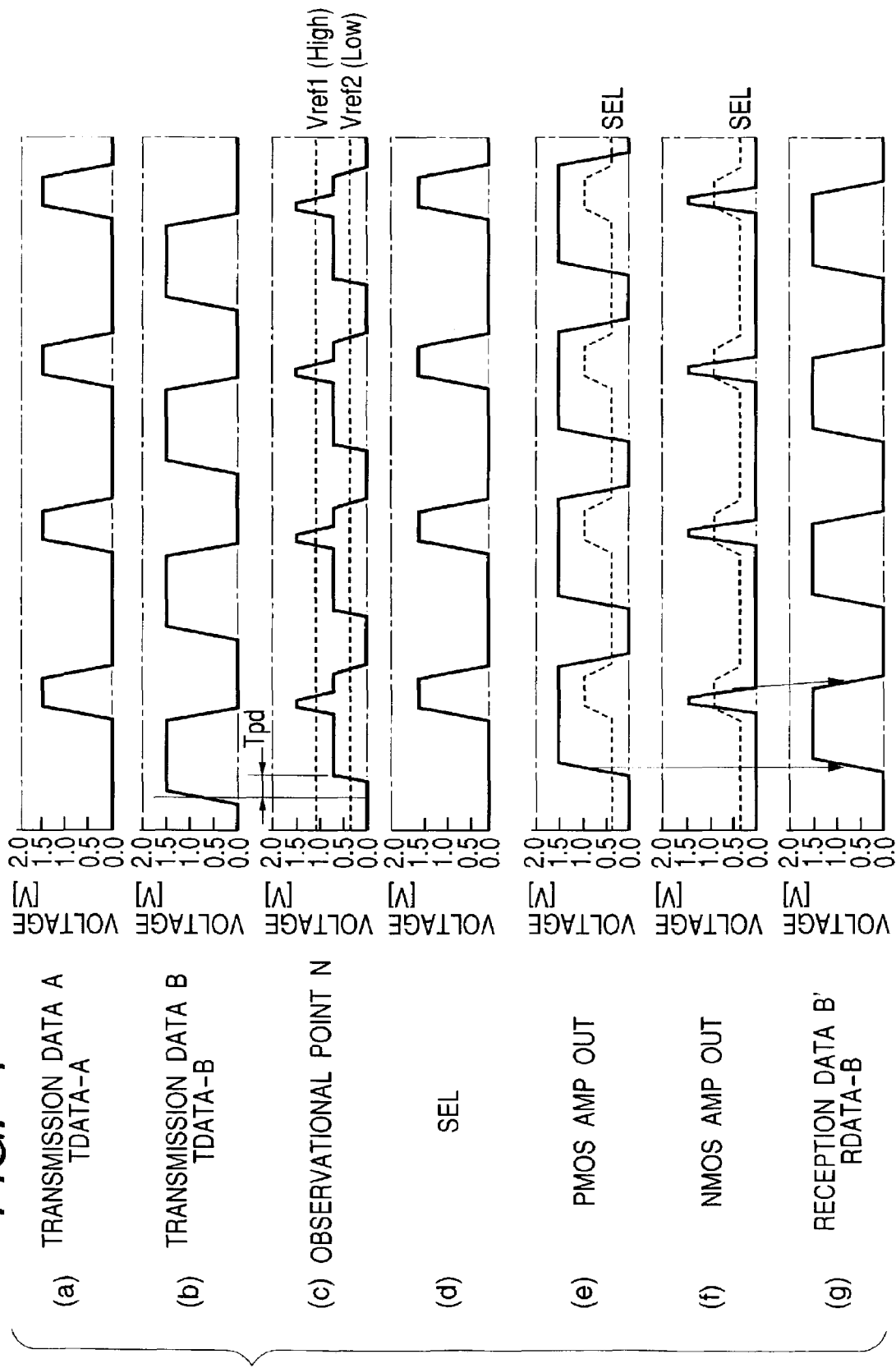

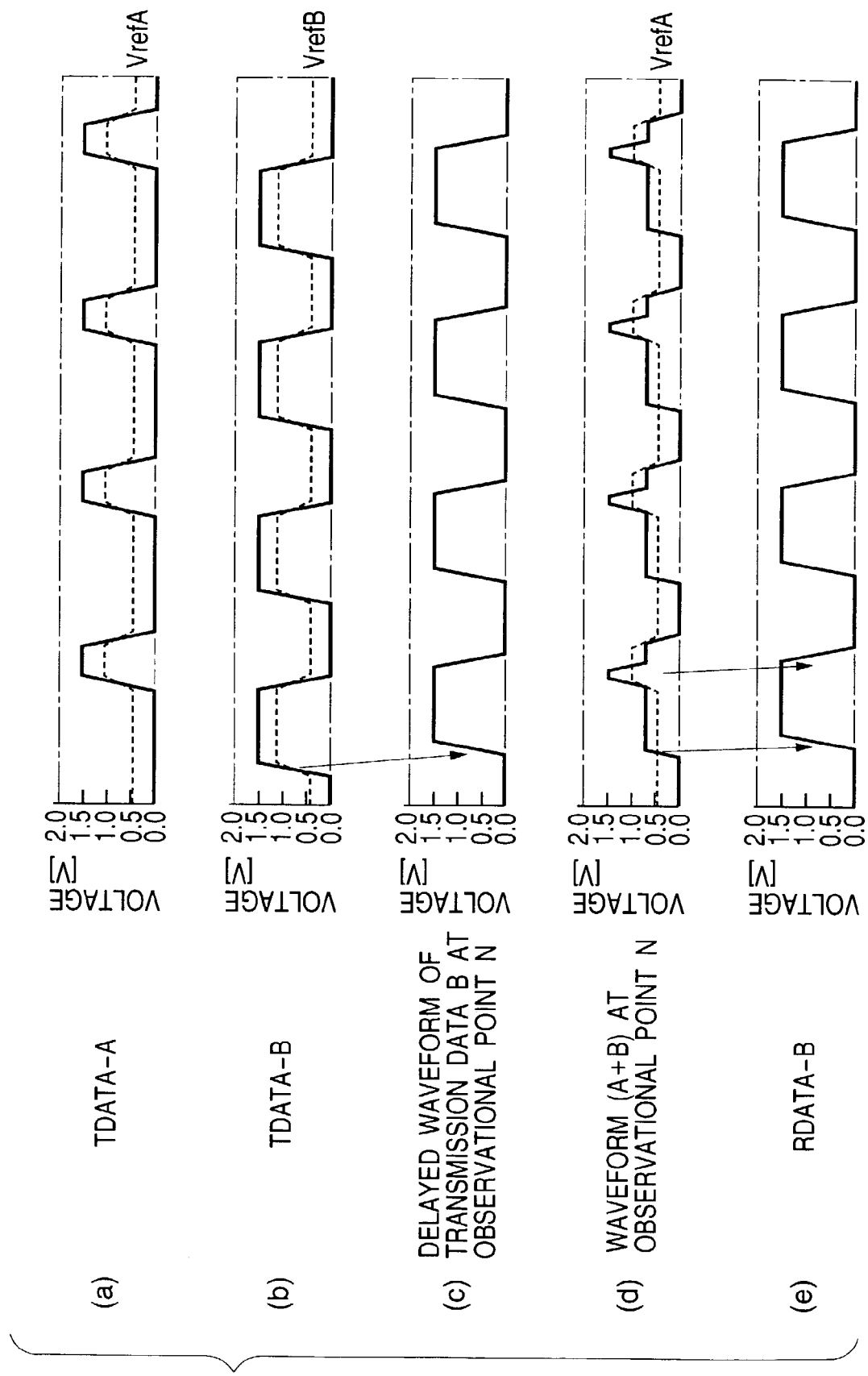

DATA TRANSMISSION SYSTEM

BACKGROUND OF THE INVENTION

The present invention relates to a technique effective for use in a digital signal transmission or a signal transmission taking on more than three levels of a transmission line, for example, to a technique effective for use in a simultaneous bi-directional data transmission system or a signal transmission system by multi-value levels.

Conventionally, a simultaneous bi-directional interface called SBTL is known which permits simultaneous data transmissions from both ends of the transmission line. In the simultaneous bi-directional interface, a bi-directional data transmission is carried out on one transmission line, and the level on the transmission line assumes any one of three levels, namely, low level, high level, and the medium level of the two, in accordance with the combination of the two data transmitted from the both ends. Therefore, a system is adopted which provides two reference voltages (logic determination levels) to the input buffer (comparator) on the reception end to thereby discriminate reception data.

The conventional simultaneous bi-directional interface includes an output buffer OBF and an input buffer IBF and a reference voltage generation circuit VRG in each chip, as shown in FIG. 11, and varies the reference voltages generated by the reference voltage generation circuit VRG in accordance with the self transmission data TDATA-A, TDATA-B as illustrated by the dotted lines in FIG. 12(a) and FIG. 12(b), and thereby discriminates the reception data RDATA-B, RDATA-A, which is a generally applied system.

However, the switching system of the reference voltages involves a problem that the switching of the reference voltages increases the jitter (shift in varying timing) of the reception data. This is because the switching of the reference voltages with one input buffer creates a deviation in the timing of determination (point of the reception data waveform crossing the reference voltages), when the reference voltages are high and low even with the same reception data. In case the reference level varies when the reception data vary, the timing of determination deviates in the case that the varying direction of the reference level is coincident with the varying direction of the reception data, and also in the case opposite to the former case.

On the other hand, as a simultaneous bi-directional interface proposed conventionally, a technique is disclosed in the Japanese Published Unexamined Patent Application No. Hei 8 (1996)-107346, which provides two input buffers (comparators) having different reference levels, brings both the two input buffers into operation, switches the selectors in the post-stage in accordance with the self transmission data, and thereby takes in data determined by the reference level according to the transmission data.

SUMMARY OF THE INVENTION

Accompanied with the recent progress in the semiconductor integrated circuit technology, the applied power supply voltage has been lowered, and the amplitude level of the transmission signal has been approximating to the power supply voltage. In these circumstances, the inventor of this invention discovered a problem that there is a difficulty in discriminating the reception data with a desired reference voltage, even with the system that discriminates the reception data with the two input buffers having different reference voltages. That is, in order to discriminate the reception data by the reference voltages in a semiconductor integrated circuit with MOSFETs as the active element, it is general to configure a differential amplifier having the input differential transistors Q1, Q2 formed of n-channel MOSFETs, as shown in FIG. 2(A). However, as the amplitude of the input signal approximates to the supply voltage because of the supply voltage being decreased, the dynamic range of the circuit becomes narrow. Accordingly, of the reference voltages Vref1, Vref2 for discriminating the reception data as shown in FIG. 2(B), the lower voltage Vref2 deviates from the permissible reference voltage setting range VAN of the differential amplifier, which leads to a possibility that gives damages to correct discriminations.

Further, in the conventional simultaneous bi-directional data transmission system, there is another problem that creates great delay fluctuations when the transmission data collide with the reception data. The reason lies in that there is a difference in the velocity of level variations on the transmission line, with a case that both the transmission data and the reception data simultaneously vary in the same direction and with a case that only one of them varies or they vary simultaneously in the opposite direction, and the former case has a faster velocity than the latter.

The invention has been made in view of the above circumstances, and an object of the invention is to provide a data transmission technique that enables a correct discrimination of the reception data, when the supply voltage. of a semiconductor integrated circuit having the simultaneous bi-directional interface is decreased.

Another object of the invention is to provide a data transmission technique that diminishes the jitter of the reception data without fluctuations of signal delay time due to the switching of the reference voltages for discriminating the reception data, during simultaneous bi-directional data transmissions between two semiconductor integrated circuits.

The foregoing and other objects and novel features of the invention will become apparent from the descriptions and accompanying drawings of this specification.

In order to accomplish the foregoing objects, according to a typical aspect of the invention, the data transmission system is provided with input circuits constituting a simultaneous bi-directional interface by the number of reference voltages used. Each of the input circuits is supplied with a fixed reference voltage, the input circuit supplied with a higher reference voltage employs a differential amplifier with n-channel MOSFETs served as input differential devices, and the input circuit supplied with a lower reference voltage employs a differential amplifier with p-channel MOSFETs served as input differential devices, in which selectors switch the outputs of the two differential amplifiers in correspondence with the output data of their own. Thus, the system attains the reception data.

With this construction, if the power supply voltage is lowered and the level of the supply voltage approximates to the amplitude level of the transmission signal, the reference voltages for discriminating the reception data will not deviate from the permissible reference voltage setting range of the differential amplifiers, which enables correct discrimination of the reception data. Since the switching of the reference voltages is not necessary, the fluctuations of signal delay time due to the switching of the reference voltages are eliminated, and the jitter of the reception data can be decreased.

In addition to the above invention, preferably, the input circuit to receive a transmission signal employs a differential amplifier that incorporates a circuit having a function of latching the input data, or a hazard prevention circuit is provided which shifts the timing of switching the selector in accordance with the transmission data and the reception data. Thereby, it is possible to avoid the inner circuits from being brought into malfunctions, resulting from the mustache-form pulses created on the reception data transmitted to the inner circuits.

BRIEF DESCRIPTION OF THE DRAWINGS

FIG. 4 is a timing chart illustrating the relations between the transmission data and the amplifier outputs and the reception data in the first embodiment;

FIG. 12 is a timing chart illustrating the relations between the transmission data and the signals at the observational point (on the transmission line) and the reception data, in the conventional simultaneous bi-directional interface.

DETAILED DESCRIPTIONS OF THE PREFERRED EMBODIMENTS

The preferred embodiments of the invention will be described with reference to the accompanying drawings.

Figure 1:
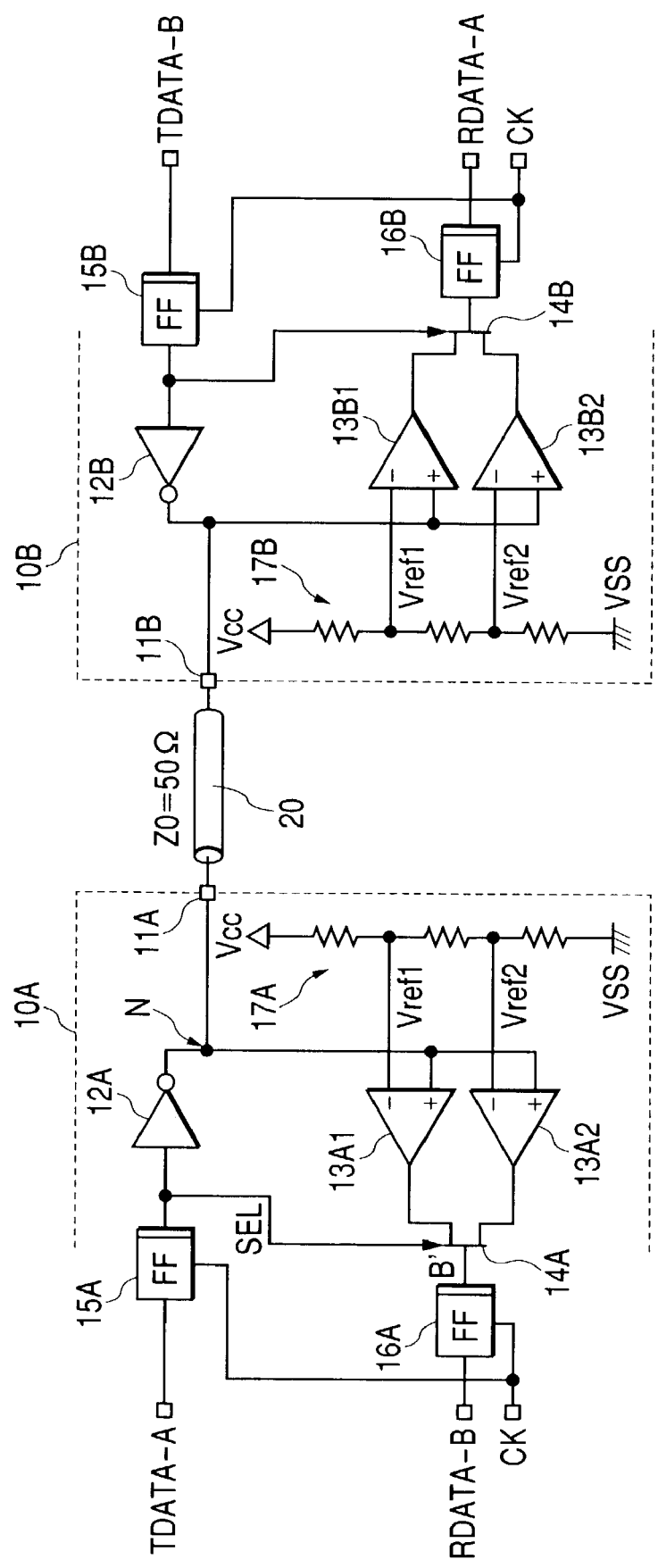
FIG. 1 is a block diagram illustrating a semiconductor integrated circuit having a simultaneous bi-directional interface to which the invention is applied, and the first embodiment of a system using the same.

FIG. 1 illustrates a semiconductor integrated circuit having a simultaneous bi-directional interface to which the invention is applied, and the first embodiment of a data transmission system using the same.

In FIG. 1, the symbols 10A, 10B signify a semiconductor integrated circuit formed on one semiconductor chip. The chips 10A, 10B are provided with external terminals 11A, 11B to which a transmission line 20 for executing a bi-direction communication is connected, and output buffers 12A, 12B of which output terminals are connected to the external terminals 11A, 11B.

Figure 2A:
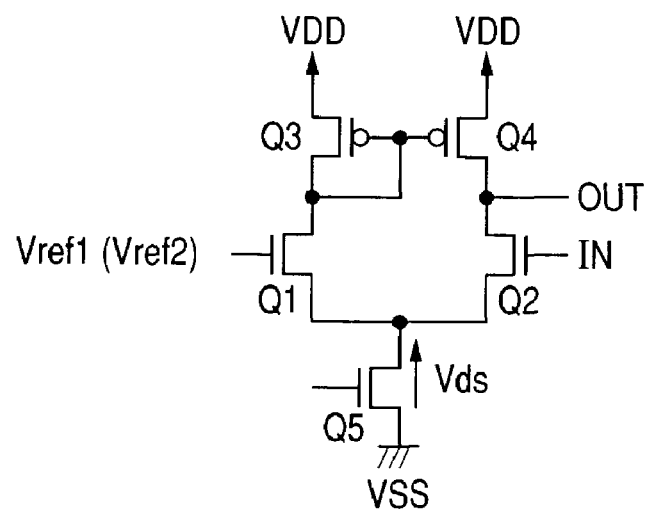
FIG. 2A is a circuit diagram illustrating an NMOS differential amplifier as an example of the input circuit.
Figure 3A:
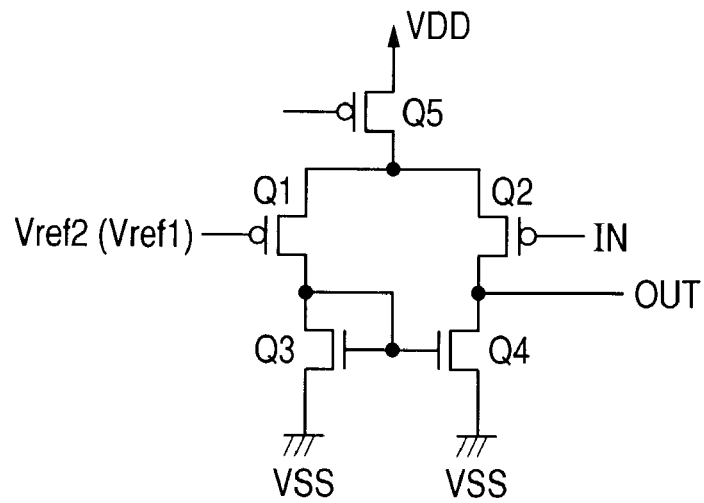
FIG. 3A is a circuit diagram illustrating a PMOS differential amplifier as an example of the input circuit.

The chip 10A is provided with two input buffers 13A1, 13A2 each made up with a differential amplifier as shown in FIG. 2(A), FIG. 3(A), of which inverted input terminal is connected to the external terminal 11A. The post-stage of these input buffers is provided with a selector 14A that selects either of the outputs of the input buffers. In the same manner, the chip 10B is provided with two input buffers 13B1, 13B2 each made up with a differential amplifier as shown in FIG. 2(A), FIG. 3(A), of which inverted input terminal is connected to the external terminal 11B. The post-stage of these input buffers is provided with a selector 14B that selects either of the outputs of the input buffers.

The pre-stages of the output buffers 12A, 12B are provided with output data latches 15A, 15B made up with flip-flops capable of latching data to be outputted. The post-stages of the selectors 14A, 14B are provided with input data latches 16A, 16B made up with flip-flops that latch input data discriminated by the input buffers.

The selectors 14A, 14B are designed to switch output data taken in by the output data latches 15A, 15B in accordance with selection control signals SEL. As a concrete circuit example of these selectors 14A, 14B, there is a circuit to be used that has the same configuration as the known clocked inverter in which two p-channel MOSFETs and two N-channel MOSFETs are connected in series between the terminals of a power supply voltage, in which the selection control signal SEL is inputted instead of the clock signal.

In this embodiment, the chip 10A is also provided with a resistor dividing circuit 17A that generates reference voltages Vref1, Vref2 each having different levels, which are applied to the non-inverted input terminals of the input buffers 13A1, 13A2; the chip 10B is also provided with a resistor dividing circuit 17B that generates reference voltages Vref1, Vref2 that are applied to the non-inverted input terminals of the input buffers 13B1, 13B2. The reference voltages Vref1, Vref2 generated by the resistor dividing circuits 17A, 17B are set to levels somewhere around ¾, ¼ of the power supply voltage, respectively.

In this embodiment, the resistor dividing circuits that generate the reference voltages Vref1, Vref2 are incorporated inside the chips. However, the reference voltages Vref1, Vref2 may be applied to the chips from outside, with provisions of the external terminals to receive the reference voltages Vref1, Vref2 to the chips each. Another arrangement may be made, such that one chip contains a resistor dividing circuit and an external terminal to output voltages generated by the resistor dividing circuit, and the other chip contains an external terminal to input the reference voltages Vref1, Vref2 outputted from the resistor dividing circuit.

The differential amplifier that makes up the input buffers 13A1, 13B1 is a circuit in which input differential transistors Q1, Q2 are composed of n-channel MOSFETs, as shown in FIG. 2(A), (hereunder, referred to as NMOS amplifier); the differential amplifier that makes up the input buffers 13A2, 13B2 is a circuit in which input differential transistors Q1, Q2 are composed of p-channel MOSFETs, as shown in FIG. 3(A), (hereunder, referred to as PMOS amplifier). Here, in the NMOS amplifier, active load transistors Q3, Q4 connected to the common source of the input differential transistors Q1, Q2 are composed of p-channel MOSFETs, and a constant current source transistor Q5 connected to the drain of input differential transistors Q1, Q2 is composed of an n-channel MOSFET. In the PNOS amplifier on the other hand, the active load transistors Q3, Q4 are composed of n-channel MOSFETs, and the constant current source transistor Q5 is composed of a p-channel MOSFET.

Figure 2B:
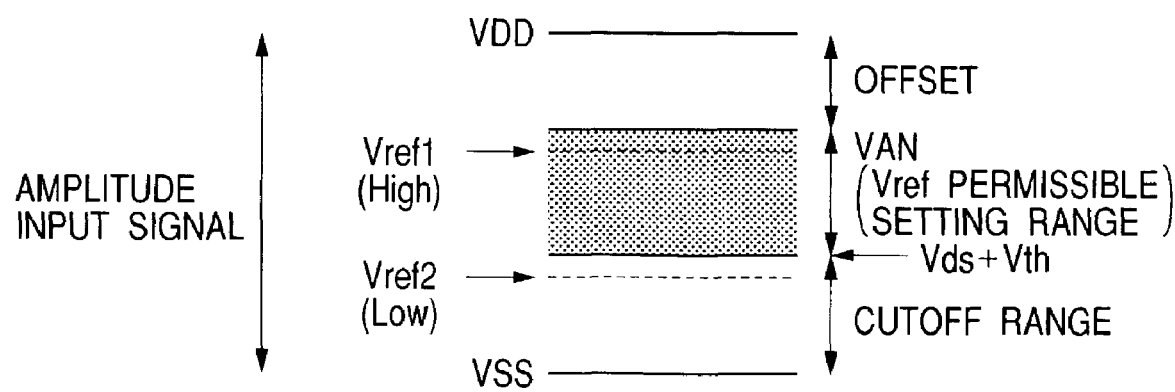
FIG. 2B is a chart illustrating the relation between the Vref permissible setting range of the amplifier and the reference voltage Vref.
Figure 3B:
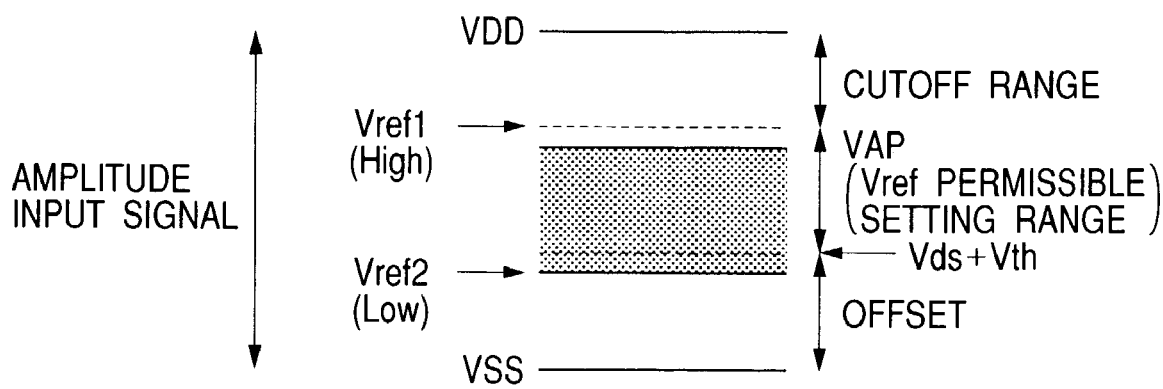
FIG. 3B is a chart illustrating the relation between the Vref permissible setting range of the amplifier and the reference voltage Vref.

As mentioned above, properly using the differential amplifiers constituting the two input buffers 13A1, 13A2 will make it possible to discriminate the input signal securely, although the amplitude of the transmitted signal approximates to the supply voltage VDD because of the supply voltage VDD being decreased. In case of the NMOS amplifier, if the level of the supply voltage VDD is close to the amplitude level of the transmitted signal, the lower reference voltage Vref2 will deviate from the Vref permissible setting range VAN of the NMOS amplifier, as shown in FIG. 2(B); in case of the PMOS amplifier on the contrary, if the level of the supply voltage VDD is close to the amplitude level of the transmitted signal, the higher reference voltage Vref1 will deviate from the Vref permissible setting range VAP of the PMOS amplifier, as shown in FIG. 3(B). However, by properly using the NMOS amplifier and PMOS amplifier, it becomes possible to discriminate the input signal securely.

FIG. 4 illustrates a timing chart of the RDATA-B received by the chip 10A, when the transmission of the TDATA-A by the chip 10A coincides with the transmission of the TDATA-B by the chip 10B, in a data transmission system to which the first embodiment of FIG. 1 is applied. In FIG. 4, Tpd signifies a delay time from the time the TDATA-B starts varying until it reaches the observational point. In this embodiment, the reference voltages Vref1, Vref2 are maintained constant all the time. During the period of the selection signal SEL being in LOW level, the PMOS amplifier output (e) is selected by the selector 14A, and during the period of the selection signal SEL being in HIGH level, the NMOS amplifier output (f) is selected by the selector 14A; thereby, a signal with a waveform as FIG. 4(g) is outputted from the selector 14A. The signal is taken in by the input data latch 16A synchronously with the clock signal CK, and is supplied to internal circuits.

Figure 5:
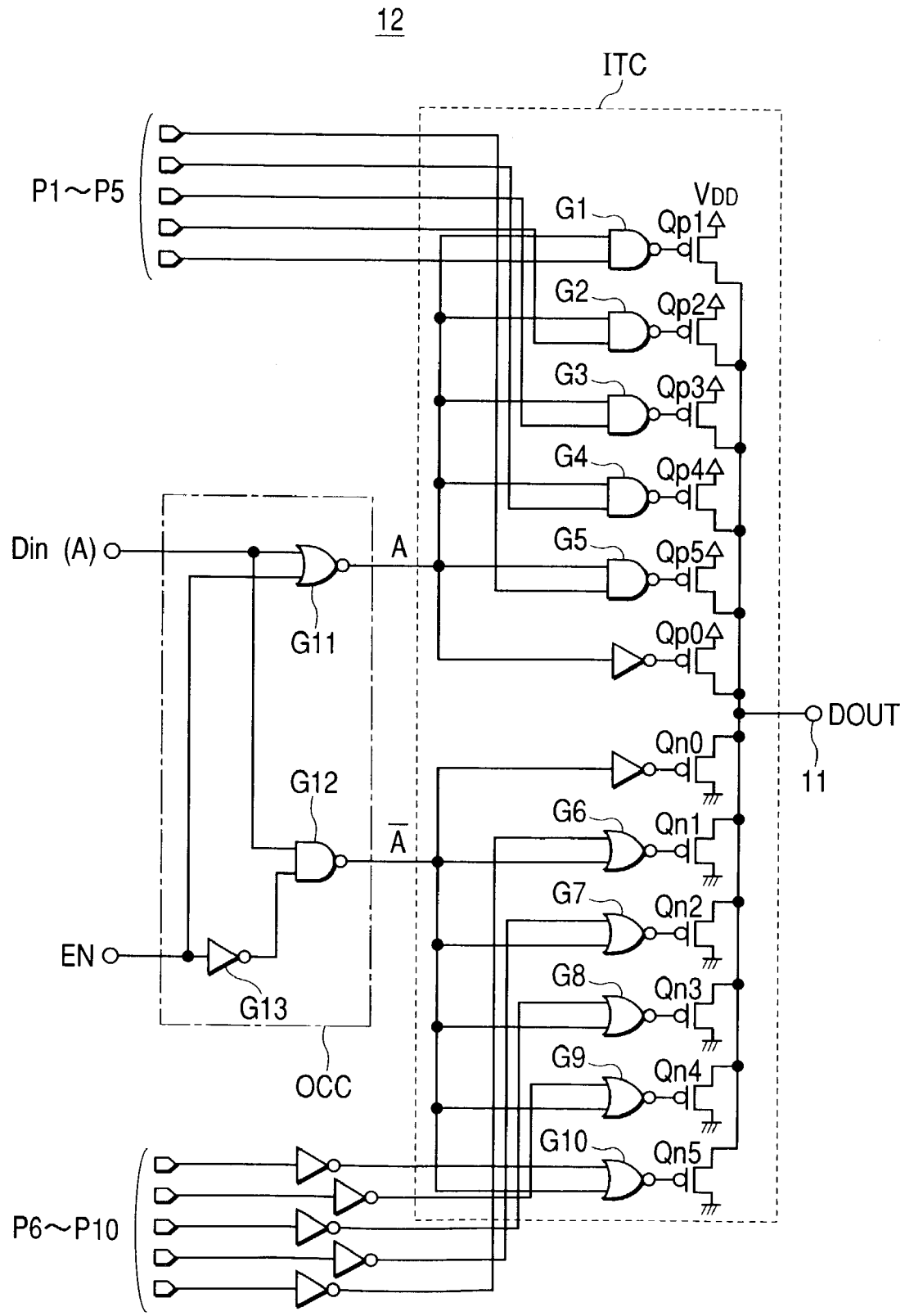
FIG. 5 is a circuit configuration chart illustrating a concrete example of an output buffer suitable for a simultaneous bi-directional interface.

FIG. 5 illustrates a concrete example of an output buffer suitable for the simultaneous bi-directional interface of the invention. Since the level of the transmission line takes three states, in the simultaneous bi-directional transmission, the correct setting of the medium level is required, and accordingly it is preferable to provide a terminating resistor for preventing the reflection of the signal. This embodiment adopts a circuit configuration that uses the resistance of the MOSFET at the final stage of the output buffer as the terminating resistor, and adds an impedance adjustment circuit to the output buffer, thereby fulfilling the impedance matching with the transmission line.

In FIG. 5, the symbols Qp0, Qn0 signify the output MOSFETs constituting the essential final output stage; and in the output buffer 12 of this embodiment, five p-channel MOSFETs Qp1 through Qp5 connected in parallel to the output MOSFET Qp0 between the supply voltage VDD and the external terminal 11, five n-channel MOSFETs Qn1 through Qn5 connected in parallel to the output MOSFET Qn0 between the external terminal 11 and the ground GND, NAND gates G1 through G5 inputting impedance control signals P1 through P5 connected to the gate terminals of the MOSFETs Qp1 through Qp5 and a signal A from an output control circuit OCC, and NOR gates G6 through G10 inputting the impedance control signals P6 through P10 connected to the gate terminals of the MOSFETs Qn1 through Qn5 and a signal /A from the output control circuit OCC constitute an impedance adjustment circuit ITC.

The impedance adjustment circuit ITC controls the number of the MOSFETs to which the output control signals A, /A are applied by means of the impedance control signals P1 through P10 to thereby fulfill the impedance matching with the transmission line and adjust the conductance ratio between the PNOS side and the NMOS side, thus achieving the desired medium level. Further in the output buffer 12 of this embodiment, a NOR gate G11 inputting a Din, data to be outputted, and an Enable signal EN in order to bring the PNOS and the NMOS simultaneously into OFF and attain a high impedance state at the output terminal of the output buffer 12, a NAND gate G12 inputting the Din and an /EN, inverted signal of the EN, and an inverter G13 that generates the inverted signal of the Enable signal EN constitute the output control circuit OCC.

Thereby, when the Enable signal EN becomes High, all the output MOSFETs Qp0 through Qp5 and MOSFETs Qn0 through Qn5 are brought into OFF, and the output terminal is brought into the high impedance state. When the Enable signal EN becomes Low, the output MOSFET corresponding to any one of the impedance control signals P1 through P10 being set to High level at that moment is brought into ON or OFF in accordance with the output data Din, whereby the signal of a desired logic level is outputted.

Here, the impedance control signals P1 through P10 are generated in accordance with control data set by a control register not illustrated. This register is designed to execute the setting of the control data with the initialization after the power is switched on, and so forth. It is also possible to configure a circuit that generates the impedance control signals P1 through P10 by using a trimming circuit including elements capable of trimming such as fuses. The function to bring the output terminal into the high impedance is provided for testing, which is not necessarily provided.

Next, the second embodiment of the invention will be described with reference to FIG. 6, FIG. 7(A) and FIG. 7(B)

Figure 6:
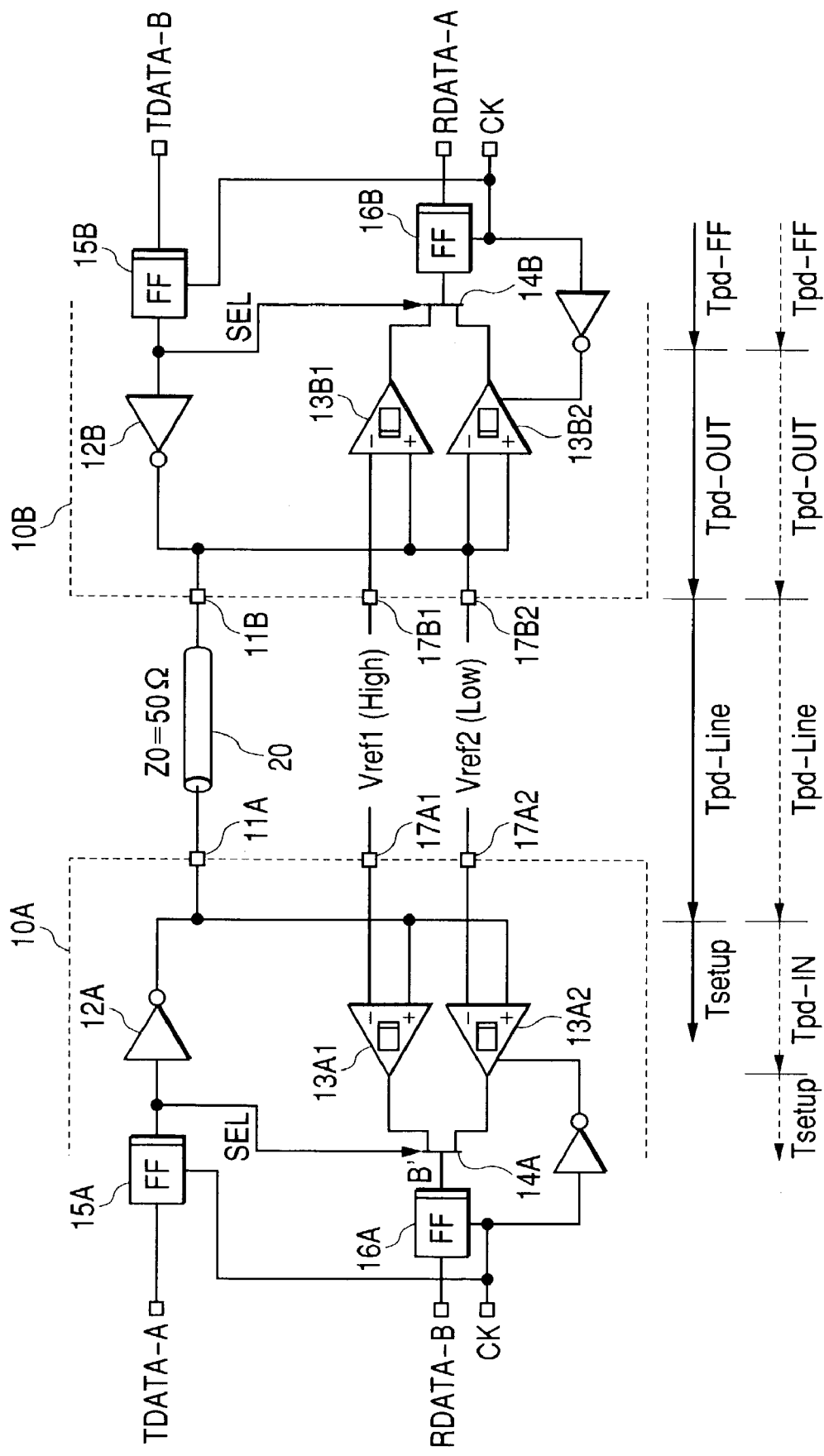
FIG. 6 is a block diagram illustrating a semiconductor integrated circuit having a simultaneous bi-directional interface to which the invention is applied, and the second embodiment of a system using the same.
Figure 7A:
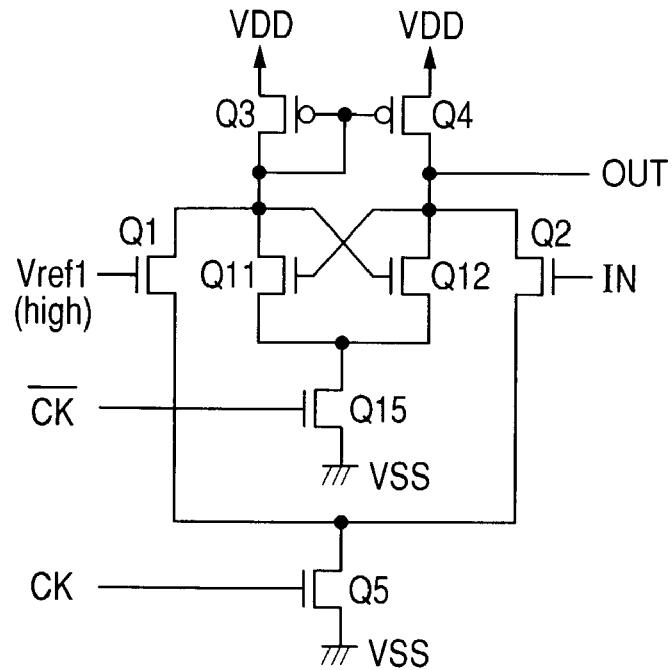
FIG. 7A and FIG. 7B are circuit diagrams illustrating an NMOS differential amplifier and a PMOS differential amplifier as an example of the input circuit in the second embodiment.
Figure 7B:
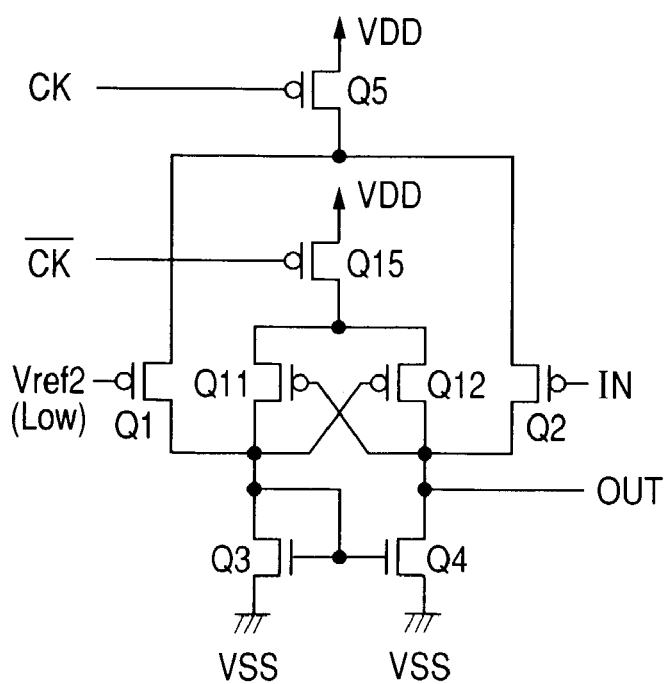

The second embodiment in FIG. 6 adopts a latch built-in NMOS amplifier and a latch built-in PMOS amplifier as shown in FIG. 7(A) and FIG. 7(B) as the input buffers 13A1, 13A2 and 13B1, 13B2. This embodiment further includes external terminals 17A1, 17A2 and 17B1, 17B2 to which the reference voltages Vref1, Vref2 for the input buffers 13A1, 13A2 and 13B1, 13B2 are applied from the outside of the chips. However, it is conceivable to provide resistor dividing circuits 15A, 15B that generate the reference voltages Vref1, Vref2 inside the chips, in the same manner as the first embodiment.

The latch built-in NMOS amplifier and PMOS amplifier as shown in FIG. 7(A) and FIG. 7(B) have the input differential transistors Q1, Q2, and second differential transistors Q11, Q12 whose drains are jointly connected with those of Q1, Q2, respectively, and Q1, Q2 and Q11, Q12 form a double differential configuration sharing the active load MOSFETs Q3, Q4. The gate terminals of the second differential transistors Q11, Q12 are supplied with the drain voltages of the first differential transistors Q2, Q1, respectively; and a second constant current MOSFET Q15 is connected to the jointly connected sources of the second differential transistors Q11, Q12.

The clock signal CK or /CK is applied to the gate terminal of the constant current MOSFET Q5, of which drain is connected commonly to the sources of the input differential transistors Q1, Q2. The reverse clock signal /CK or CK is applied to the gate terminal of the second constant current MOSFET Q15. The transistors Q5 and Q15 are switched ON and OFF complementally. Thereby, the latch built-in NMOS amplifier and PMOS amplifier as shown in FIG. 7(A) and FIG. 7(B) operate as a differential amplifier, and when the clock signal CK or /CK turns the constant current MOSFET Q5 ON; thereafter, when the clock signal CK or /CK is inverted, they operate to shift into a hold state that holds a signal amplified immediately before.

In the data transmission system that uses the foregoing latch built-in NMOS amplifier and PMOS amplifier as the input buffers 13A1, 13A2 and 13B1, 13B2, in which the transmission line 20 connects both the chips, the data transmission delay can be decreased in comparison to the system using the NMOS amplifier and PMOS amplifier that do not incorporate the latches, as shown in FIG. 2(A) and FIG. 3(A). The reason is as follows. The data transmission delay in the system using the NMOS amplifier and PMOS amplifier that do not incorporate the latches is equivalent, as shown by the dotted arrow in FIG. 6, to the sum of a delay Tpd-FF by the output data latch 15B on the transmission side, a delay Tpd-out by the output buffer 12B, a delay Tpd-Line by the transmission line, a delay Tpd-IN by the input buffers 13A1, 13A2, and a setup time Tsetup until the input data latch 14A becomes able to latch the data. As contrasted with this, in the system to which the second embodiment is applied, the delay Tpd-IN by the input buffers 13A1, 13A2 will not appear, and the data transmission delay decreases to that extent.

Figure 11:
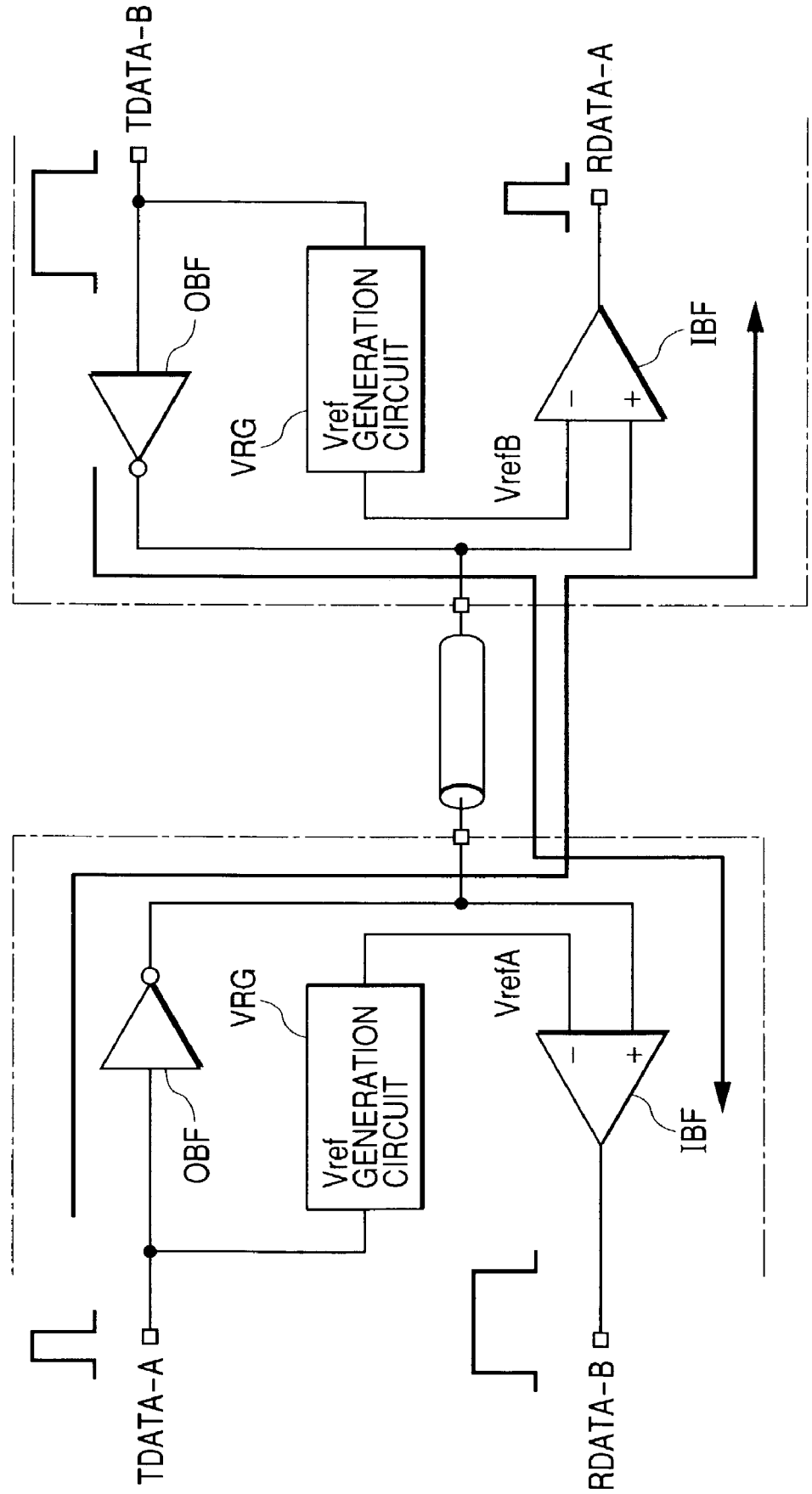
FIG. 11 is a circuit configuration chart illustrating a conventional simultaneous bi-directional interface.

As an applied example of the latch built-in differential amplifier in FIG. 7(A) and FIG. 7(B), there is a conceivable semiconductor integrated circuit as follows. That is, the concept is to use the circuits in FIG. 7(A) and FIG. 7(B) as the differential amplifiers forming the conventional input buffers IBF in FIG. 11. According to such a construction, it is possible to attain the effect of decreasing the data transmission delay, in comparison to the system using the differential amplifiers that do not incorporate the latches as the input buffers IBF, although it is impossible to achieve the effect of lowering the jitter of the reception data by the switching of the reference voltages Vref1, Vref2.

Further in these embodiments, an arrangement is made to carry out the data fetching by the output data register (corresponding to 14 in FIG. 1) provided at the pre-stage of the output buffer 12 at the rise timing of the clock CK, and to carry out the data fetching by the NMOS amplifier and PMOS amplifier at the fall timing of the clock CK. By the arrangement thus made, if the output signal and the input signal collide, namely, if both of them vary simultaneously in the same direction, the NMOS amplifier and PMOS amplifier are made not to fetch data at that timing. Thereby, it is possible to avoid the delay fluctuations of the reception data due to the collision of data, found in the conventional circuit.

Next, the third embodiment of the invention will be described with reference to FIG. 8 and FIG. 9.

Figure 8:
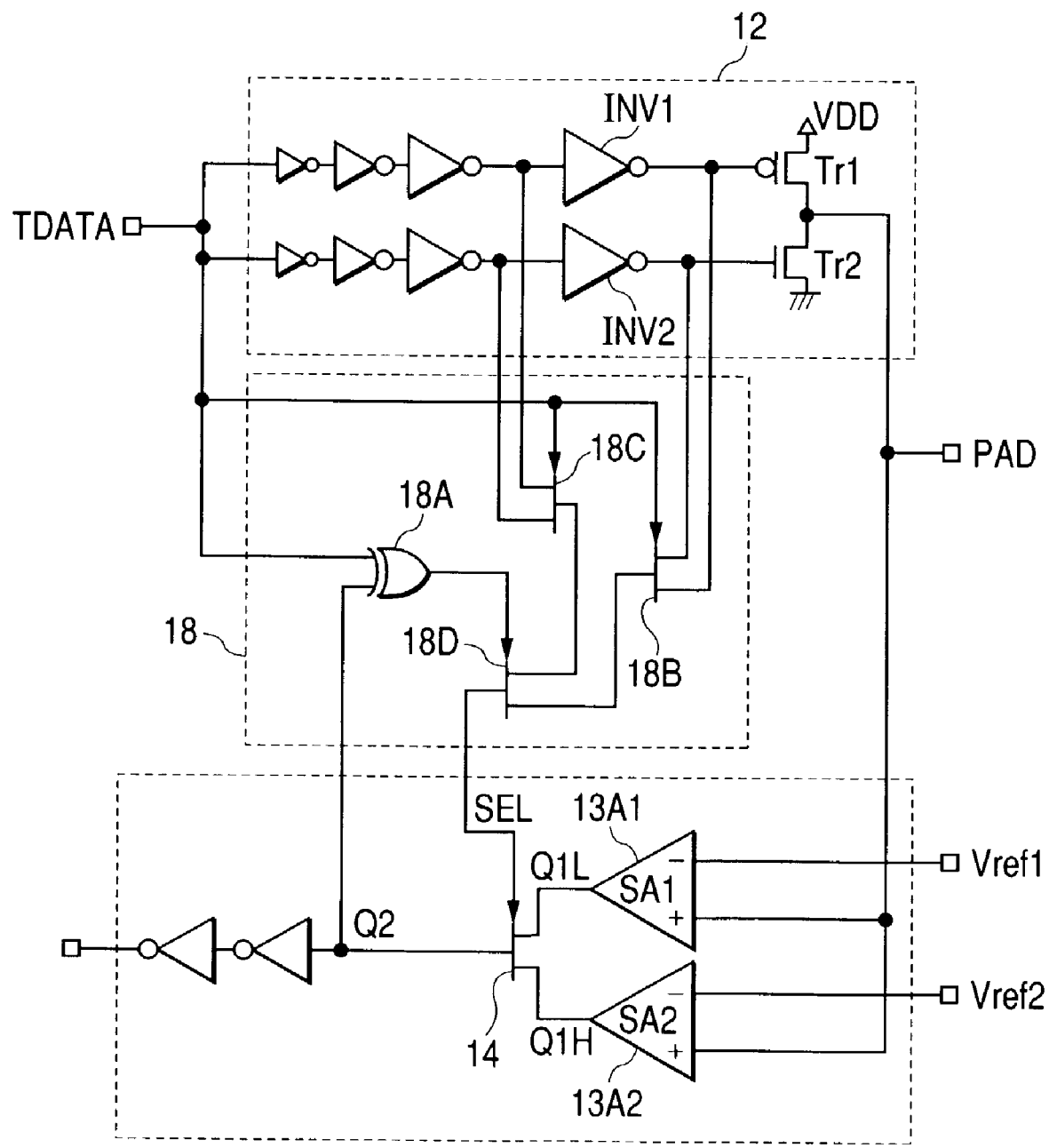
FIG. 8 is a circuit configuration chart illustrating the third embodiment of a simultaneous bi-directional interface of the invention.

Third embodiment in FIG. 8 is an example that improves imperfections of the system using the NMOS amplifier and PMOS amplifier that do not incorporate the latches, as shown in FIG. 2(A) and FIG. 3(A), as the input buffers 13A1, 13A2 and 13B1, 13B2 in the first embodiment (FIG. 1). Concretely, in the first embodiment using the NMOS amplifier and PMOS amplifier that do not incorporate the latches, there is a possibility that generates mustache-form pulses on the output signal Q2 of the selector 14 due to the relation between the output timing of the transmission data TDATA and the switching timing of the selector 14, or due to the relation between the operational speeds of the NMOS amplifier and PMOS amplifier, which brings the inner circuits into malfunctions. In order to solve this problem, the third embodiment includes a hazard prevention circuit 18, as shown in FIG. 8, which has an Exclusive OR gate 18A inputting the transmission data TDATA and the output signal Q2 of the selector 14.

The hazard prevention circuit 18 includes the Exclusive OR gate 18A, a selector 18B for selecting either of the outputs of inverters INV1, INV2 that drive the gates of MOSFETs Tr1, Tr2 constituting the output stage of the output buffer 12, a selector 18C for selecting either of the inputs of the inverters INV1, INV2, and a selector 18D for selecting either of the outputs of the selectors 18B and 18C. The switching control of the selectors 18B and 18C is carried out in accordance with the transmission data TDATA, and the switching control of the selector 18D is carried out in accordance with the output of the Exclusive OR gate 18A.

Figure 9:
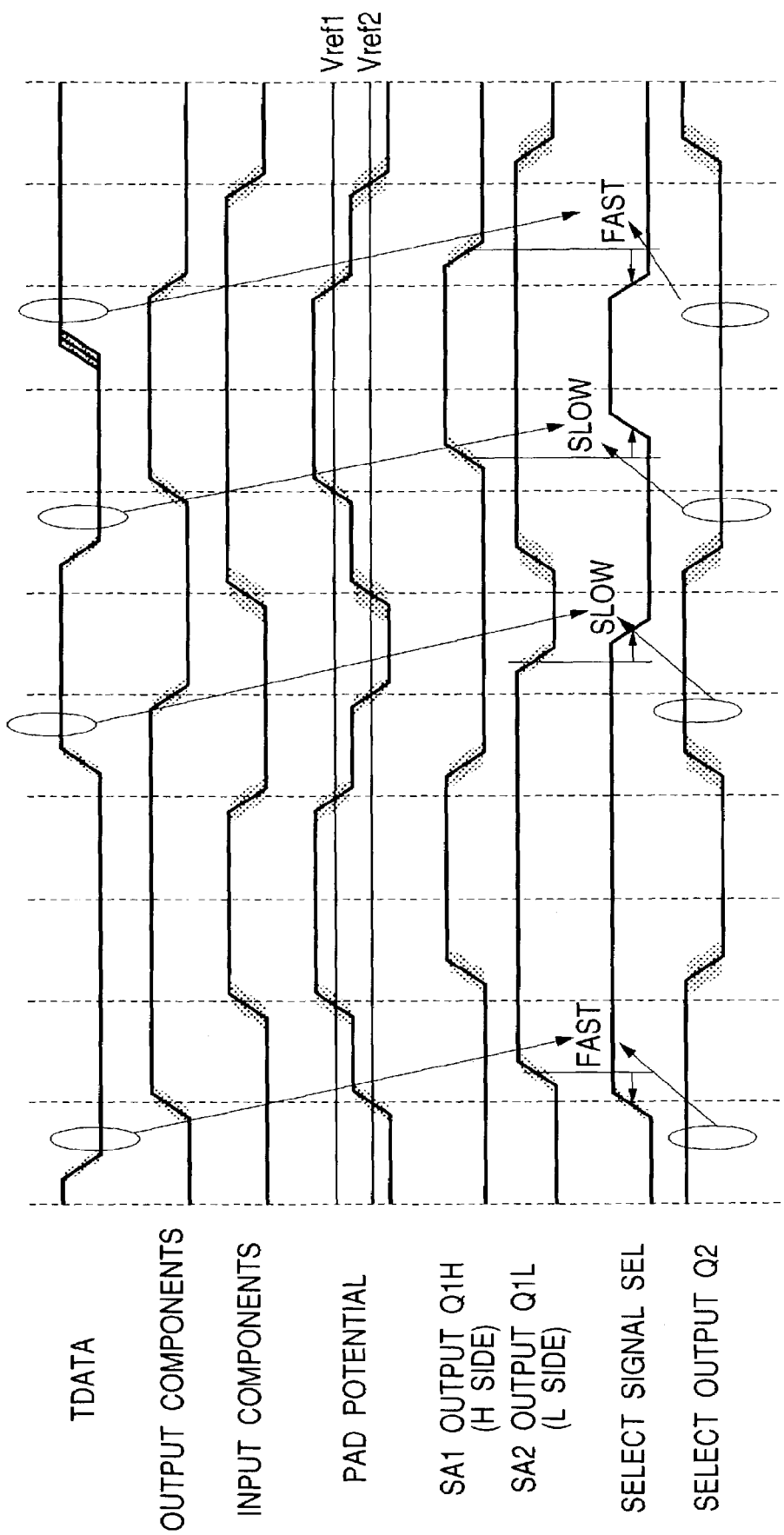
FIG. 9 is a timing chart illustrating the relations between the transmission data and the amplifier outputs and the reception data in the third embodiment.

FIG. 9 illustrates the timings of the signals in the embodiment shown in FIG. 8. In the embodiment shown in FIG. 8, the hazard prevention circuit 18 operates so as to quicken the timing of the switch control signal SEL to the selector 14, when the logic level of the transmission data TDATA is different from that of the output signal Q2 of the selector 14; and it operates so as to delay the timing of the switch control signal SEL to the selector 14, when the logic levels of the transmission data TDATA and the output signal Q2 of the selector 14 are equal. By this circuit construction, it becomes possible to avoid the inner circuits from being brought into malfunctions, resulting from the mustache-form pulses appearing on the output signal Q2 of the selector 14.

In the second embodiment (FIG. 6) employing the latch built-in NMOS amplifier and PMOS amplifier as shown in FIG. 7(A) and FIG. 7(B) as the input buffers 13A1, 13A2 and 13B1, 13B2, if an arrangement is made which sets the latch timings of the output signals from the selectors 14A, 14B by the data latches 16A, 16B so as to deviate from the appearing timing of the mustache-form pulses, the hazard prevention circuit 18 will not be needed.

Next, the fourth embodiment of the invention will be described based on FIG. 10.

Figure 10:
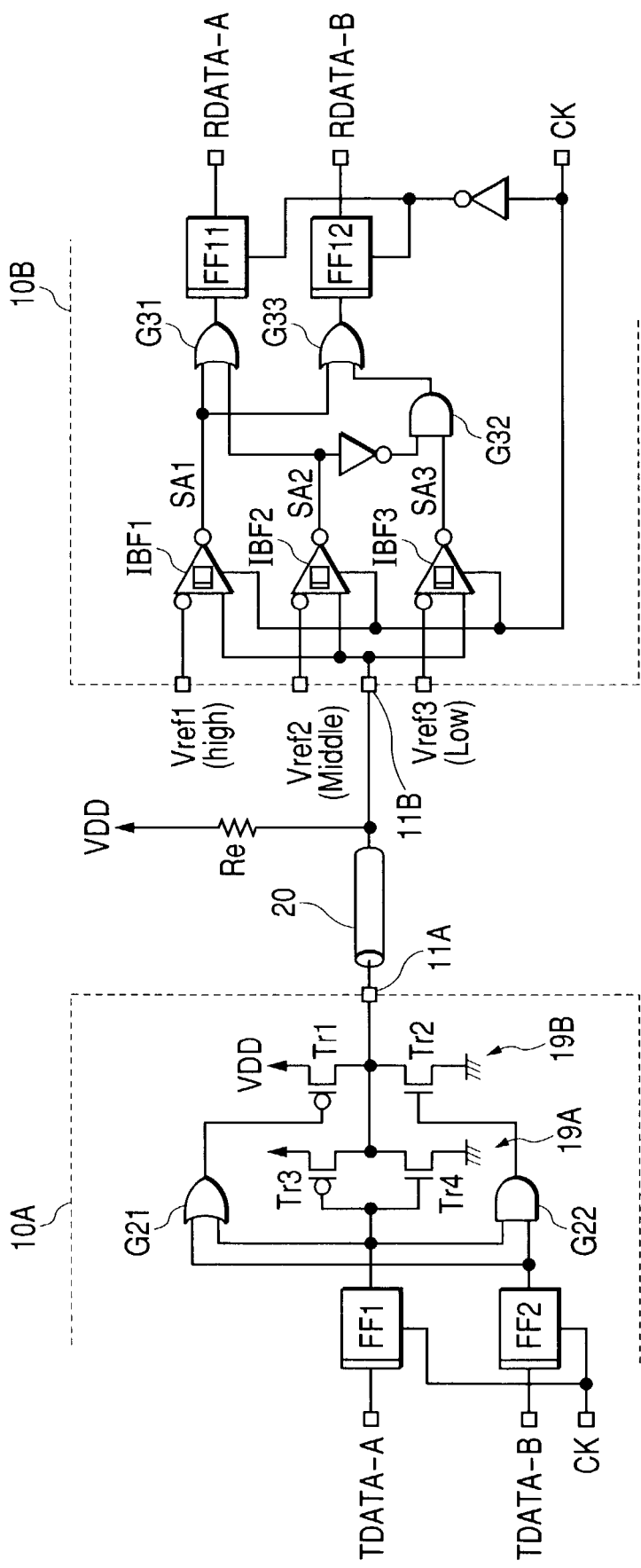
FIG. 10 is a circuit configuration chart illustrating the fourth embodiment of a simultaneous bi-directional interface of the invention.

This embodiment illustrated in FIG. 10 is an example that transmits data by multi-value levels through the transmission line 20 in between the semiconductor chips 10A and 10B. However, the direction of data transmission is one-way (from A to B in the drawing). In order for the reverse directional data transmission, the chip 10B is provided with a transmission circuit to transmit data from the chip 10B to the chip 10A, and the chip 10A is provided with a reception circuit, although they are not illustrated. In this embodiment, a terminate resistor Re is provided on the reception side of the transmission line 20.

The transmission circuit in this embodiment includes flip-flops FF1, FF2 that latch 2-bit transmission data TDATA-A, TDATA-B, an OR-gate G21 and an AND-gate G22 that input the data latched by the flip-flops FF1, FF2, and a CMOS inverter 19A and a push-pull output stage 19B, of which output nodes are connected to the external terminal 11A. Here, the gate terminals of the MOSFETs Tr3, Tr4 constituting the CMOS inverter 19A are supplied with the output signal of the flip-flop FF1. The gate terminals of the MOSFETs TR1, Tr2 constituting the push-pull output stage 19B are supplied with the output signals of the OR-gate G21 and the AND-gate G22.

The reception circuit of the chip 10B on the reception side includes input circuits IBF1, IBF2, IBF3 composed of three differential amplifiers, whose non-inverted input terminals are connected to an external terminal 11B that inputs the reception data, whose inverted input terminals are supplied with reference voltages Vref1, Vref2, Vref3 each having different levels (Vref1>Vref2>Vref3), an OR-gate G31 that inputs the outputs of the input circuits IBF1 and IBF2, an AND-gate G32 that inputs the output of the IBF2 and the inverted output of the IBF3, and an OR-gate G33 that inputs the output of the AND-gate D32 and the output of the input circuit IBF1.

In this embodiment, of the input circuits IBF1, IBF2, IBF3, the IBF1 uses an NMOS sense amplifier composed of differential transistors of n-channel MOSFETs, and the IBF3 uses a PMOS sense amplifier composed of differential transistors of p-channel MOSFETs. The IBF2 may be either of the NMOS sense amplifier and the PMOS amplifier. The reference voltages Vref1, Vref2, Vref3 are set to levels such as 6/7, 4/7, 2/7 of the supply voltage VDD, respectively. Thereby, it becomes possible to avoid a situation that the reference voltages Vref1 and Vref3 deviate from the Vref permissible setting range of the differential amplifiers, which disables the input circuits from determining input signal levels.

The input circuits IBF1, IBF2, IBF3 in this embodiment may be differential amplifiers having flip-flops built in, as shown in FIG. 7(A), FIG. 7(B); or, they may be common differential amplifiers that do not incorporate flip-flops, as shown in FIG. 2(A) and FIG. 3(A). The reference voltages Vref1, Vref2, Vref3 may be supplied from outside, as shown in FIG. 10; however, a reference voltage generation circuit composed of a resistor dividing circuit and so forth may be provided inside the chip.

Next, the operation of data transmission in this embodiment will be explained.

First, the transmission circuit selectively turns the output transistors TR1 through Tr4 ON according to the transmission data TDATA-A, TDATA-B. Accordingly, the potential of the external terminal 11B of the chip 10B on the reception side is changed into a level corresponding to the ratio of an ON-resistance of the transistor turned ON against a resistance of the terminate resistor Re of the transmission line 20. This potential is compared with the reference voltages Vref1, Vref2, Vref3 by the three input circuits IBF1, IBF2, IBF3 composed of the differential amplifiers of the chip 10B on the reception side, and thereby the input signal levels are discriminated. The logic gates G31 through G33 restore the reception data RDATA-A RDATA-B identical to the transmission data TDATA-A TDATA-B in accordance with the combinations of the outputs from the input circuits IBF1, IBF2, IBF3. The reception data RDATA-A RDATA-B are latched by the flip-flops FF11, FF12, and supplied to the inner circuits.

Next, Table 1 illustrates the relations between the transmission data TDATA-A, TDATA-B, the ON/OFF states of the output transistors TR1 through Tr4, the potentials of the transmission line 20, the outputs SA1, SA2, SA3 of the input circuits IBF1, IBF2, IBF3 of the reception side chip, reception data RDATA-A, RDATA-B.

TABLE 1

| Transmission data | | | | | | | | | | reception data | |
|---|---|---|---|---|---|---|---|---|---|---|---|
| TDATA-A | TDATA-B | Tr1 | Tr2 | Tr3 | Tr4 | Transmission line | SA1 | SA2 | SA3 | RDATA-A | RDATA-B |
| L | L | ON | OFF | ON | OFF | VDD | H | H | H | L | L |
| L | H | OFF | OFF | ON | OFF | 5VDD/7 | L | H | H | L | H |
| H | L | OFF | OFF | OFF | ON | 3VDD/7 | L | L | H | H | L |
| H | H | OFF | ON | OFF | ON | VDD/7 | L | L | L | H | H |

Table 1 confirms that the 2-bit transmission data TDATA-A, TDATA-B are converted into 4-value level signals to be transmitted through the transmission line, and are correctly restored into the 2-bit reception data RDATA-A, RDATA-B again.

The invention made by the inventor has been described in concrete on the basis of the embodiments. However, the invention is not limited to the above embodiments, and it should be understood that various changes and modifications are possible without a departure from the scope and the spirit of the invention.

The invention made by the inventor has been described with regard to the bi-directional data transmission between the semiconductor integrated circuits, the applicable field that formed the background of the invention. However, the invention can be applied to the bi-directional data transmission between the board systems on which the semiconductor integrated circuits are mounted.

The effect attained by a typical one of the invention disclosed in this application will be briefed as follows.

It is possible to correctly discriminate the reception data, when the supply voltage of a semiconductor integrated circuit having the simultaneous bi-directional interface is lowered. It is also possible to diminish the jitter of the reception data without fluctuations of signal delay time due to the switching of the reference voltages for discriminating the reception data, during simultaneous bi-directional data transmissions between two semiconductor integrated circuits.

What is claimed is:

1. A data transmission system comprising:
   a first semiconductor integrated circuit provided with an external terminal and a data signal output circuit connected to the external terminal;
   a second semiconductor integrated circuit provided with an external terminal and a data signal input circuit connected to the external terminal; and
   a transmission line, connected to the external terminals, which transmits a data signal from the first semiconductor integrated circuit to the second semiconductor integrated circuit,
   wherein the data signal input circuit has two or more differential amplifiers that compare signals inputted to data input terminals with reference voltages to discriminate the inputted signals, and
   wherein one of the differential amplifiers to which the highest reference voltage is applied is a first type differential amplifier of which input differential transistors have n-channel field effect transistors, the other of the differential amplifiers to which the lowest reference voltage is applied is a second type differential amplifier of which input differential transistors have p-channel field effect transistors, and these differential amplifiers discriminate three levels or more of the transmission line to thereby discriminate reception data.

2. A data transmission system according to claim 1, wherein the differential amplifiers have a latch function.

3. A data transmission system according to claim 1, wherein a terminate resistor is connected between an end of the transmission line on the side of the second semiconductor integrated circuit and a supply voltage terminal, and 2-bit or more binary information can be transmitted simultaneously by multi-value levels of the transmission line.

4. A bi-directional data transmission system comprising:
a first semiconductor integrated circuit;
a second semiconductor integrated circuit; and
a transmission line,
wherein each of the first and second integrated circuits includes an external terminal of input-output combined use, a data signal output circuit connected to the external terminal, and a data signal input circuit connected to the external terminal,
wherein the transmission line is connected to the external terminals for transmitting data to each other,
wherein the data signal input circuit has two or more differential amplifiers that compare signals inputted to data input terminals with reference voltages to discriminate the inputted signals, and
wherein one of the differential amplifiers to which the highest reference voltage is applied is a first type differential amplifier of which input differential transistors have n-channel field effect transistors, the other of the differential amplifiers to which the lowest reference voltage is applied is a second type differential amplifier of which input differential transistors have p-channel field effect transistors, and these differential amplifiers discriminate three levels or more of the transmission line to thereby discriminate reception data.

5. A bi-directional data transmission system according to claim 4, wherein selector circuits are provided on the post-stages of the differential amplifiers, and the selector circuits each select an output of any one of the two or more differential amplifiers in accordance with a data signal to be outputted from the data signal output circuit incorporated in the semiconductor integrated circuit, and transmit an output signal of the selected output to inner circuits.

6. A bi-directional data transmission system according to claim 5, wherein the differential amplifiers have a latch function.

7. A bi-directional data transmission system according to claim 5, further including a hazard prevention circuit capable of adjusting the timing of a switch control signal of the selector circuit, based on the data signal to be outputted from the data signal output circuit and the output signal from the selector circuit.

8. A bi-directional data transmission system according to claim 4, wherein a circuit to generate the reference voltages is provided to both the first semiconductor integrated circuit and the second semiconductor integrated circuit.

9. A bi-directional data transmission system according to claim 4, wherein the data signal output circuit is provided with an impedance adjusting circuit to achieve the matching with an impedance of the transmission line.

10. A data transmission system according to claim 2, wherein a terminate resistor is connected between an end of the transmission line on the side of the second semiconductor integrated circuit and a supply voltage terminal, and 2-bit or more binary information can be transmitted simultaneously by multi-value levels of the transmission line.

* * * * *